(12) United States Patent
Kwon et al.

(10) Patent No.: US 12,537,188 B2
(45) Date of Patent: Jan. 27, 2026

(54) POSITIVE ELECTRODE ACTIVE MATERIAL, METHOD OF PREPARING THE SAME, AND LITHIUM SECONDARY BATTERY INCLUDING THE SAME

(71) Applicants: POSCO Holdings Inc., Seoul (KR); RESEARCH INSTITUTE OF INDUSTRIAL SCIENCE & TECHNOLOGY, Pohang-si (KR); POSCO FUTURE M CO., LTD., Pohang-si (KR)

(72) Inventors: Ohmin Kwon, Incheon (KR); Kwon Young Choi, Seoul (KR); Sang Hyuk Lee, Incheon (KR); Jung Hoon Song, Gwacheon-si (KR); Jong Il Park, Pohang-si (KR); Sang Cheol Nam, Seoul (KR); Inchul Park, Incheon (KR); Geun Hwangbo, Incheon (KR)

(73) Assignees: POSCO Holdings Inc., Seoul (KR); RESEARCH INSTITUTE OF INDUSTRIAL SCIENCE & TECHNOLOGY, Pohang-si (KR); POSCO FUTURE M CO., LTD., Pohang-si (KR)

(*) Notice: Subject to any disclaimer, the term of this patent is extended or adjusted under 35 U.S.C. 154(b) by 831 days.

(21) Appl. No.: 17/786,888

(22) PCT Filed: Dec. 18, 2020

(86) PCT No.: PCT/KR2020/018665
§ 371 (c)(1),
(2) Date: Jun. 17, 2022

(87) PCT Pub. No.: WO2021/125882
PCT Pub. Date: Jun. 24, 2021

(65) Prior Publication Data
US 2023/0039543 A1    Feb. 9, 2023

(30) Foreign Application Priority Data

Dec. 20, 2019   (KR) .......................... 10-2019-0172472

(51) Int. Cl.
*H01M 4/36*    (2006.01)
*C01G 53/42*   (2025.01)
(Continued)

(52) U.S. Cl.
CPC ............ *H01M 4/366* (2013.01); *C01G 53/42* (2013.01); *H01M 4/36* (2013.01); *H01M 4/525* (2013.01);
(Continued)

(58) Field of Classification Search
CPC ...... H01M 4/366; H01M 4/505; H01M 4/525; H01M 4/131; H01M 4/1391; H01M 4/62;
(Continued)

(56) References Cited

U.S. PATENT DOCUMENTS

2016/0260965 A1* 9/2016 Wu .................. H01M 4/366
2020/0152978 A1* 5/2020 Cho ................. H01M 4/366

FOREIGN PATENT DOCUMENTS

CN    103563138 A    2/2014
JP    2006-073482 A  3/2006
(Continued)

OTHER PUBLICATIONS

KR_101668799_B1 Original File and Translation (Year: 2016).*
(Continued)

*Primary Examiner* — Milton I Cano
*Assistant Examiner* — Katherine J Metzger
(74) *Attorney, Agent, or Firm* — Sughrue Mion, PLLC

(57) ABSTRACT

The present disclosure relates to a positive electrode active material for a lithium secondary battery including lithium metal oxide particles; and a coating layer placed on at least
(Continued)

a part of a surface of the lithium metal oxide particles, wherein the coating layer includes B, LiOH, $Li_2CO_3$, and $Li_2SO_4$.

7 Claims, 7 Drawing Sheets

(51) Int. Cl.
  *H01M 4/525* (2010.01)
  *H01M 10/052* (2010.01)
  *H01M 4/02* (2006.01)
  *H01M 4/131* (2010.01)
  *H01M 4/1391* (2010.01)
  *H01M 4/505* (2010.01)
  *H01M 4/62* (2006.01)
  *H01M 10/0525* (2010.01)

(52) U.S. Cl.
  CPC ....... *H01M 10/052* (2013.01); *C01P 2002/52* (2013.01); *C01P 2002/54* (2013.01); *C01P 2004/03* (2013.01); *H01M 2004/028* (2013.01); *H01M 4/131* (2013.01); *H01M 4/1391* (2013.01); *H01M 4/505* (2013.01); *H01M 4/62* (2013.01); *H01M 10/0525* (2013.01); *Y02E 60/10* (2013.01)

(58) Field of Classification Search
  CPC .. H01M 4/36; H01M 10/0525; H01M 10/052; H01M 2004/028; C01G 53/42; C01G 53/04; C01P 2002/52; C01P 2002/54; C01P 2004/03; C01P 2004/61; C01P 2004/80; C01P 2006/40; Y02E 60/10
  See application file for complete search history.

(56) References Cited

FOREIGN PATENT DOCUMENTS

| JP | 2010-009960 A | 1/2010 | |
|---|---|---|---|
| JP | 2023-521005 A | 5/2023 | |
| KR | 10-2012-0133300 A | 12/2012 | |
| KR | 10-2015-0050458 A | 5/2015 | |
| KR | 10-2015-0109668 A | 10/2015 | |
| KR | 10-2015-0109669 A | 10/2015 | |
| KR | 10-2015-0112762 A | 10/2015 | |
| KR | 10-2016-0050835 A | 5/2016 | |
| KR | 101668799 B1 * | 10/2016 | ............ C01G 53/44 |
| KR | 10-2017-0075596 A | 7/2017 | |
| KR | 10-2019-0078720 A | 7/2019 | |
| KR | 10-2019-0079526 A | 7/2019 | |
| WO | 2006/027925 A2 | 3/2006 | |

OTHER PUBLICATIONS

International Search Report for PCT/KR2020/018665 dated Jun. 10, 2021.
Japanese Decision of Grant dated Jul. 18, 2023 in Application No. 2022-538325.
Dingding Lv et al., "$Li_2O$—$B_2O_3$—$Li_2SO_4$ modified $LiNi_{1/3}Co_{1/3}Mn_{1/3}O_2$ cathode material for enhanced electrochemical performance", Electrochimica Acta, vol. 247, 2017, pp. 803-811 (9 pages total).
Office Action issued Nov. 20, 2024 in Korean Patent Application No. 10-2022-7024237.
Office Action issued Aug. 21, 2023 in Chinese Application No. 202080088648.2.

* cited by examiner

POSITIVE ELECTRODE ACTIVE MATERIAL, METHOD OF PREPARING THE SAME, AND LITHIUM SECONDARY BATTERY INCLUDING THE SAME

CROSS REFERENCE TO RELATED APPLICATIONS

This application is a National Stage of International Application No. PCT/KR2020/018665 filed Dec. 18, 2020, claiming priority based on Korean Patent Application No. 10-2019-0172472 filed Dec. 20, 2019, the entire disclosures of which are incorporated herein by reference.

TECHNICAL FIELD

The present invention relates to a positive electrode active material, a method of preparing the same, and a lithium secondary battery including the same.

BACKGROUND ART

Recently, thanks to the explosive increase in demand of IT mobile devices and small power driving devices (such as an e-bike and a small EV) and the needs of electric vehicles having a mileage of 400 km or more, the development of a secondary battery having a high capacity and a high energy density for powering the devices is actively in progress worldwide.

In order to manufacture a high-capacity battery as such, a high-capacity positive electrode active material should be used. A material having the highest capacity among existing layered positive electrode active materials is $LiNiO_2$ (275 mAh/g), but since it easily undergoes structural collapse during charging and discharging and has low thermal stability due to an oxidation number problem, it is difficult to commercialize the material.

In order to solve the problem, an NCM-based positive electrode active material in which a heterogeneous transition metal (such as Co and Mn) is substituted on a Ni site to improve electrochemical stability has been developed.

DISCLOSURE

Technical Problem

The present invention has been made in an effort to provide a positive electrode active material including B, LiOH, $Li_2CO_3$, and $Li_2SO_4$ in a coating layer placed on a surface of a lithium metal oxide particle. Accordingly, a positive electrode active material, which may secure a high capacity, have excellent high-temperature life characteristics, and have decreased initial resistance and a resistance increase rate, may be provided.

Technical Solution

An exemplary embodiment of the present invention provides a positive electrode active material for a lithium secondary battery including: lithium metal oxide particles, and a coating layer placed on at least a part of a surface of the lithium metal oxide particles, wherein the coating layer may include B, LiOH, $Li_2CO_3$, and $Li_2SO_4$.

A content of the B may be in a range of 10 ppm to 5000 ppm, based on the entire positive electrode active material.

A content of the LiOH may be in a range of 100 ppm to 10000 ppm, based on the entire positive electrode active material.

A content of the $Li_2CO_3$ may be in a range of 1000 ppm to 5000 ppm, based on the entire positive electrode active material.

A content of the $Li_2SO_4$ may be in a range of 10 ppm to 3000 ppm, based on the entire positive electrode active material.

The $Li_2CO_3$ may come from an internal reaction, without introducing a lithium raw material separately.

A content of nickel of metals in the lithium metal oxide particles may be 85 mol % or more.

Another embodiment of the present invention provides a method of preparing a positive electrode active material for a lithium secondary including: introducing an aqueous metal salt solution into a co-precipitation reactor to obtain a metal precursor; mixing the metal precursor, a lithium raw material, and a doping raw material to prepare a mixture; subjecting the mixture to a first heat treatment and cooling the mixture; and washing a product from the cooling with water, drying the product, mixing the product with a coating layer forming material, and subjecting the mixture to a second heat treatment, wherein the coating layer forming material includes a boron compound, LiOH, and $Li_2SO_4$.

The second heat treatment may be performed in a temperature range of 200 to 450° C.

After the second heat treatment, obtaining a positive electrode active material having a coating layer formed thereon may be included, wherein the coating layer incudes B, LiOH, $Li_2CO_3$, and $Li_2SO_4$.

The $Li_2CO_3$ may come from an internal reaction.

A content of the boron compound included in the coating layer forming material may be in a range of 10 ppm to 5000 ppm, based on the entire coating layer forming material.

A content of LiOH included in the coating layer forming material may be in a range of 100 ppm to 10,000 ppm, based on the entire coating layer forming material.

A content of $Li_2SO_4$ included the coating layer forming material may be in a range of 10 ppm to 3000 ppm, based on the entire coating layer forming material.

Yet another embodiment of the present invention provides a lithium secondary battery including a positive electrode including the positive electrode active material according to an exemplary embodiment, a negative electrode, and a non-aqueous electrolyte.

Advantageous Effects

Since the positive electrode active material according to an exemplary embodiment includes all of B, LiOH, $Li_2CO_3$, and $Li_2SO_4$ in a coating layer, it may secure a high capacity of a positive electrode active material, have excellent life characteristics at a high temperature, and have significantly decreased initial resistance and resistance increase rate.

MODE FOR INVENTION

Figure 1:
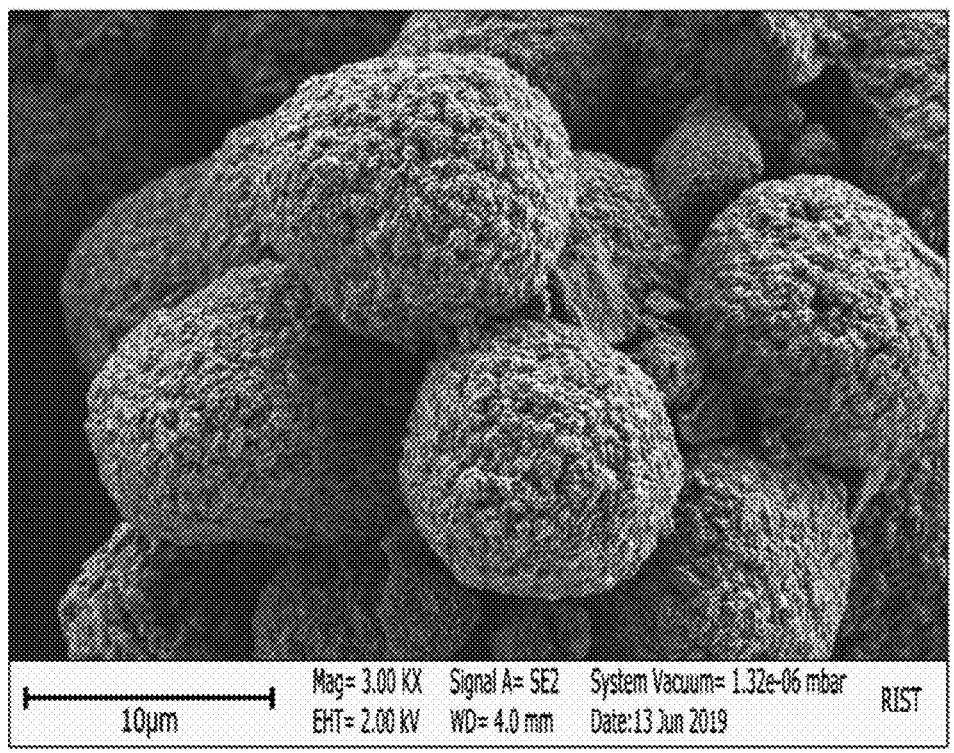
FIG. 1 shows results of SEM analysis of a surface of a positive electrode active material of Example 3.

The terms such as first, second, and third are used for describing various parts, components, areas, layers, and/or sections, but are not limited thereto. These terms are used only for distinguishing one part, component, area, layer, or section from other parts, components, areas, layers, or sections. Therefore, a first part, component, area, layer, or section described below may be mentioned as a second part, component, area, layer, or section without departing from the scope of the present invention.

The terminology used herein is only for mentioning a certain example, and is not intended to limit the present invention. Singular forms used herein also includes plural forms unless otherwise stated clearly to the contrary. The meaning of "comprising" used in the specification is embodying certain characteristics, regions, integers, steps, operations, and/or components, but is not excluding the presence or addition of other characteristics, regions, integers, steps, operations, and/or components.

When it is mentioned that a part is present "on" the other part, the part may be present directly on the other part, or another part may be involved between them. In contrast, when it is mentioned that a part is present "directly on" the other part, there is no part interposed between them.

Though not defined otherwise, all terms including technical terms and scientific terms used herein have the same meaning as commonly understood by a person with ordinary skill in the art to which the present invention pertains. Terms defined in commonly used dictionaries are further interpreted as having a meaning consistent with the related technical literatures and the currently disclosed description, and unless otherwise defined, they are not interpreted as having an ideal or very formal meaning.

In addition, unless otherwise particularly stated, % means wt %, and 1 ppm is 0.0001 wt %.

Hereinafter, an exemplary embodiment of the present invention will be described in detail so that a person with ordinary skill in the art to which the present invention pertains may easily practice the invention. As those skilled in the art would realize, the described embodiments may be modified in various different ways, all without departing from the spirit or scope of the present invention.

The positive electrode active material for a lithium secondary battery according to an exemplary embodiment is characterized by including: lithium metal oxide particle, and a coating layer placed on at least a part of a surface of the lithium metal oxide particles, wherein the coating layer includes B, LiOH, $Li_2CO_3$ and $Li_2SO_4$.

More specifically, the lithium metal oxide particles may have a layered structure, and since the coating layer including all of B, LiOH, $Li_2CO_3$, and $Li_2SO_4$ is placed on the surface of the particles, resistance of the surface portion of the positive electrode active material may be decreased. Accordingly, a capacity may be increased, and also life characteristics at a high temperature may be improved. In addition, an initial resistance and a resistance increase rate at a high temperature may be significantly decreased.

That is, since the positive electrode active material of the present exemplary embodiment includes at least four elements or compounds together in the coating layer, as described above, a synergistic effect may be shown.

In the present exemplary embodiment, the content of the B may be in a range of 50 ppm to 2000 ppm, more specifically, in a range of 100 ppm to 1000 ppm, based on the entire positive electrode active material. When the content of B satisfies the range, an average crystal grain size in firing of the positive electrode active material may be decreased, the initial resistance and the resistance increase rate at a high temperature may be significantly decreased.

The content of the LiOH may be in a range of 1200 ppm to 4000 ppm, more specifically, in a range of 1500 ppm to 3500 ppm, based on the entire positive electrode active material. When the content of LiOH included in the coating layer satisfies the range, a high capacity may be secured, and also life characteristics may be improved.

The content of the $Li_2CO_3$ may be in a range of 1000 ppm to 5000 ppm, more specifically, in a range of 1500 ppm to 4000 ppm or 2000 ppm to 3500 ppm, based on the entire positive electrode active material. When the content of $Li_2CO_3$ satisfies the range, life characteristics at room temperature and at a high temperature may be improved excellently, and a resistance increase rate and an average leakage current value may be decreased. Here, the $Li_2CO_3$ is a compound coming from a reaction of metal raw materials forming lithium metal oxides and other coating layer forming raw materials, without introducing a coating layer forming raw material separately.

The content of the $Li_2SO_4$ may be in a range of 5 ppm to 1000 ppm, more specifically, in a range of 10 ppm to 700 ppm or 10 ppm to 500 ppm, based on the entire positive electrode active material. When the content of $Li_2SO_4$ satisfies the range, excellent capacity properties may be secured, and also life characteristics may be improved and an initial resistance value may be decreased.

As such, since the positive electrode active material of the present exemplary embodiment includes all of B, LiOH, $Li_2CO_3$, and $Li_2SO_4$ in a coating layer, a lithium secondary battery to which the positive electrode active material is applied shows an excellent discharge capacity, while also showing improved initial efficiency and excellent life characteristics at room temperature and a high temperature. In addition, initial resistance and a resistance increase rate may be significantly decreased.

The effect is obtained when all of B, LiOH, $Li_2CO_3$, and $Li_2SO_4$ are included, and in the case of not including any one of them, the physical properties to be desired may not be obtained.

Meanwhile, in the present exemplary embodiment, the content of nickel of metals in the lithium metal oxide may be 85 mol % or more, more specifically 88 mol % or more, or 90 mol % or more.

When the content of nickel of metals in the lithium metal oxide is 80% or more as in the present exemplary embodiment, a positive electrode active material having high power characteristics may be implemented. Since the positive electrode active material of the present exemplary embodiment having the composition as such has an increased energy density per volume, the capacity of a battery to which the positive electrode active material is applied may be improved, and the battery may be suitable for use for an electric vehicle.

The method of preparing a positive electrode active material according to another exemplary embodiment includes: introducing an aqueous metal salt solution into a co-precipitation reactor to obtain a metal precursor; mixing the metal precursor, a lithium raw material, and a doping raw material to prepare a mixture; subjecting the mixture to a first heat treatment and cooling the mixture; and washing a product from the cooling with water, drying the product, mixing the product with a coating layer forming material, and subjecting the mixture to a second heat treatment, wherein the coating layer forming material includes a boron compound, LiOH, and $Li_2SO_4$.

First, a step of introducing an aqueous metal salt solution into a co-precipitation reactor to obtain a metal precursor is performed.

More specifically, a metal raw material forming a lithium metal oxide, for example, a nickel raw material, a cobalt raw material, a manganese raw material, and the like are mixed with distilled water to prepare an aqueous metal salt solution, which is then introduced to a reactor and subjected to a co-precipitation process, thereby obtaining a metal precursor.

Next, a step of mixing the metal precursor, a lithium raw material, and a doping raw material to prepare a mixture is performed.

The lithium metal oxide of the present exemplary embodiment may be doped with an element such as Al. Here, for the content of the doping element, the doping element is introduced so that for example, 3000 ppm to 4000 ppm of Zr and 200 ppm to 350 ppm of Al are included based on the entire lithium metal oxide, thereby preparing the lithium metal oxide.

Since a Zr ion occupies a Li site, Zr acts as a kind of pillar and relieves contraction of a lithium ion path during a charging and discharging process to cause stabilization of a layered structure. In addition, Al may stabilize the layered structure of the positive electrode active material. Therefore, the life characteristics of a lithium secondary battery may be further improved. Therefore, by including the doping element, the life characteristics of a lithium secondary battery to which the positive electrode active material of the present exemplary embodiment may be further improved.

Thereafter, a step of subjecting the mixture to a first heat treatment and then cooling the mixture is performed.

The first heat treatment may be performed, for example, in a temperature range of 700° C. to 850° C. A first heat treatment time may be in a range of 3 hours to 40 hours. When first heat treatment conditions satisfy the range, the sum of LiOH and $Li_2CO_3$ which are residual lithium on the surface of a positive electrode is less than 10000 ppm and a crystal grain size is in a range of 80 nm to 210 nm, and thus, a battery having excellent life and resistance characteristics and excellent thermal stability may be implemented.

After performing the heat treatment as such, a step of cooling a fired body is performed. Specifically, the cooling step may be performed by a common method.

Next, a step of washing a product from the cooling step with water, drying the product, mixing the product with a coating layer forming material, and subjecting the mixture to a second heat treatment.

The washing and the drying are for removing residual lithium on the surface and removing moisture on the surface of the washed positive electrode active material surface. The washing and the drying may be performed by a common method.

The second heat treatment may be performed in a temperature range of 200 to 450° C., and a heat treatment time may be 1 hr to 12 hr. These are appropriate temperature and time ranges as long as these do not impair the life characteristics at a high temperature. When the second heat treatment satisfies all of the conditions, a coating layer including all of B, LiOH, $Li_2CO_3$, and $Li_2SO_4$ is formed.

In the positive electrode active material prepared, each content range of B, LiOH, $Li_2CO_3$, and $Li_2SO_4$ is as described above for an exemplary embodiment, and thus, will be omitted herein.

Meanwhile, in the present exemplary embodiment, the coating layer forming material includes a boron compound, LiOH, and $Li_2SO_4$. That is, $Li_2CO_3$ included in the coating layer of the finally obtained positive electrode active material is formed by an internal reaction of other raw materials introduced in the preparing process, and a separate raw material is not introduced.

In the coating layer forming material, the content of the boron compound may be 500 ppm to 2000 ppm, based on the entire coating layer forming material. When the content of the boron compound introduced to the coating layer forming material satisfies the range, a crystal grain size of the positive electrode active material is in a range of 80 nm to 210 nm, and thus, excellent thermal stability is shown.

Here, the boron compound includes, for example, $H_3BO_3$, boron oxide, boron compounds containing Li, BN, $B_4C$, $B_2H_6$, $B_2F_4$, $B_2Cl_4$, $B_2Br_4$, $B_2I_4$, and the like.

In addition, the content of the LiOH included in the coating layer forming material may be 500 ppm to 3500 ppm, based on the entire coating layer forming material. When the content of LiOH introduced to the coating layer forming material satisfies the range, gelation of a slurry by residual lithium is suppressed, so that a slurry in a state of being applied to an electrode may be prepared in the manufacture of a positive electrode.

The content of $Li_2SO_4$ included in the coating layer forming material may be 10 ppm to 1000 ppm, based on the entire coating layer forming material. When the content of $Li_2SO_4$ introduced to the coating layer forming material satisfies the range, a Li—B—C—$SO_4$-based ion conductor is formed on the surface, and thus, mobility of a lithium ion on the surface of the positive electrode active material may be improved to implement a lithium secondary battery having excellent life characteristics.

That is, in the present exemplary embodiment, the amount of LiOH and $Li_2SO_4$ introduced is less than the amount of LiOH and $Li_2SO_4$ present in the coating layer of the finally obtained positive electrode active material. This is expected to be due to a reaction of lithium and a metal raw material present in the lithium metal oxide in a second heat treatment process after introducing the coating layer forming material.

Specific properties of the positive electrode active material prepared by the method described above are as described above for an exemplary embodiment, and thus, will be omitted herein.

In addition, the process conditions for preparing the positive electrode active material in the present exemplary embodiment will be described in detail in the examples described later.

In another exemplary embodiment of the present invention, a lithium secondary battery including: a positive electrode including the positive electrode active material according to an exemplary embodiment of the present invention described above, a negative electrode including a negative electrode active material, and an electrolyte disposed between the positive electrode and the negative electrode, is provided.

Description for the positive electrode active material is as described above for an exemplary embodiment of the present invention, and thus, will be omitted herein.

The positive electrode active material layer may include a binder and a conductive material.

The binder serves to attach the positive electrode active material particles to each other well, and also, serves to attach the positive electrode active material to a current collector well.

The conductive material is used for imparting conductivity to an electrode, and any conductive material is used as long as it is an electroconductive material which does not cause a chemical change, in a battery configured.

The negative electrode includes a current collector and a negative electrode active material layer formed on the current collector, and the negative electrode active material layer includes a negative electrode active material.

The negative electrode active material includes a material capable of reversibly intercalating/deintercalating a lithium ion, a lithium metal, an alloy of lithium metal, a material capable of doping/dedoping lithium, or a transition metal oxide.

The material reversibly intercalating/deintercalating a lithium ion is a carbon material, and any carbonaceous negative electrode active material commonly used in a lithium ion secondary battery may be used, and a representative example thereof may be crystalline carbon, amorphous carbon, or a combination thereof.

An alloy of the lithium metal may be an alloy of a metal selected from the group consisting of Na, K, Rb, Cs, Fr, Be, Mg, Ca, Sr, Si, Sb, Pb, In, Zn, Ba, Ra, Ge, Al, and Sn.

The material capable of doping/dedoping lithium may include Si, $SiO_x$ (0<x<2), a Si—Y alloy (Y is an element selected from the group consisting of alkali metals, alkaline earth metals, Group 13 elements, Group 14 elements, transition metals, rare earth elements, and combinations thereof, but is not Si), Sn, $SnO_2$, Sn—Y (Y is an element selected from the group consisting of alkali metals, alkaline earth metals, Group 13 elements, Group 14 elements, transition metals, rare earth elements, and combinations thereof, but is not Sn), and the like.

The transition metal oxide may include vanadium oxides, lithium vanadium oxides, and the like The negative electrode active material layer may further include a binder, and optionally, a conductive material.

The binder serves to attach the negative active material particles to each other well, and also, to attach the negative electrode active material to a current collector well.

The conductive material is used for imparting conductivity to an electrode, and any conductive material may be used as long as it is an electroconductive material which does not cause a chemical change in a battery to be configured.

The current collector may be a material selected from the group consisting of a copper foil, a nickel foil, a stainless steel foil, a titanium foil, a nickel foam, a copper foam, a polymer substrate coated with a conductive material, and a combination thereof.

The negative electrode and the positive electrode are manufactured by mixing an active material, a conductive material, and a binder in a solvent to prepare an active material composition, and applying the composition on a current collector. Since the method of manufacturing an electrode as such is well known in the art, the detailed description thereof will be omitted in the present specification. As the solvent, N-methylpyrrolidone and the like may be used, but the present invention is not limited thereto.

The electrolyte includes a non-aqueous organic solvent and a lithium salt.

The non-aqueous organic solvent serves as a medium to allow ions participating in the electrochemical reaction of a battery to move.

The lithium salt is dissolved in an organic solvent and acts as a source of a lithium ion in a battery to allow operation of a basic lithium secondary battery and promote movement of a lithium ion between a positive electrode and a negative electrode.

Depending on the type of lithium secondary battery, a separator may be present between a positive electrode and a negative electrode. As the separator, a multilayer film of polyethylene, polypropylene, polyvinylidene fluoride, or two layers thereof may be used, and a mixed multilayer such as a polyethylene/polypropylene two-layer separator, a polyethylene/polypropylene/polyethylene three-layer separator, and a polypropylene/polyethylene/polypropylene three-layer separator may be used, of course.

The lithium secondary battery may be classified into a lithium ion battery, a lithium ion polymer battery, and a lithium polymer battery depending on the kinds of separator and electrolyte, may be classified into a cylindrical type, a prismatic type, a coin type, a pouch type, and the like depending on the shape, and may be classified into a bulk type and a thin film type depending on its size. Since the structure and the manufacturing method of these batteries are well known in the art, the detailed description thereof will be omitted.

Hereinafter, the examples of the present invention will be described in detail. However, these are presented as an example and the present invention is not limited by the examples, and the present invention is only defined only by the scope of claims described later.

Preparation Example 1—Preparation of Positive Electrode Active Material Precursor A precursor having a composition ($Ni_{0.92}Co_{0.04}Mn_{0.04}$, $OH)_2$ was prepared by a common co-precipitation method.

Specifically, $NiSO_4 \cdot 6H_2O$ was used as a nickel raw material, $CoSO_4 \cdot 7H_2O$ was used as a cobalt raw material, and $MnSO_4 \cdot H_2O$ was used as a manganese raw material. These raw materials were dissolved in distilled water to prepare an aqueous metal salt solution.

Next, a co-precipitation reactor was prepared, $N_2$ was purged for preventing oxidation of a metal ion during the co-precipitation reaction, and the temperature of the reactor was maintained at 50° C.

$NH_4(OH)$ was introduced to the co-precipitation reactor as a chelating agent, and NaOH was used for adjusting the pH.

Precipitates obtained by the co-precipitation process were filtered, washed with distilled water, and dried in an oven at 100° C. for 24 hours to prepare a positive electrode active material precursor having an average particle diameter of 14.8 μm.

Comparative Example 1—Preparation of Ni 90% Positive Electrode Active Material 1.05 mol of $LiOH \cdot H_2O$ (Samchun Chemical Co., Ltd., battery grade) based on 1 mol of the positive electrode active material precursor prepared in Preparation Example 1 and a doping raw material were uniformly mixed to prepare a mixture. At this time, $ZrO_2$ (Aldrich) in an amount such that Zr is 3,400 ppm and $Al(OH)_3$ (Aldrich) in an amount such that Al is 280 ppm as the doping raw material were used.

The mixture was charged into a tube furnace and fired while oxygen flowed thereinto at 200 ml/min. In the firing process, a first heat treatment was performed at 480° C. for 5 hours, heating was performed to 760° C. at a heating rate of 5° C./min, the temperature was maintained for 16 hours, and a product from the firing process was naturally cooled to 25° C., thereby preparing a positive electrode active material.

Comparative Example 2—Ni 90% Positive Electrode Active Material Including 500 ppm of Boron 1.05 mol of $LiOH·H_2O$ (Samchun Chemical Co., Ltd., battery grade) based on 1 mol of the positive electrode active material precursor prepared in Preparation Example 1 and a doping raw material were uniformly mixed to prepare a mixture. At this time, $ZrO_2$ (Aldrich) in an amount such that Zr is 3,400 ppm and $Al(OH)_3$ (Aldrich) in an amount such that Al is 280 ppm as the doping raw material were used.

The mixture was charged into a tube furnace and fired while oxygen flowed thereinto at 200 ml/min. In the firing process, a first heat treatment was performed at 480° C. for 5 hours, heating was performed to 760° C. at a heating rate of 5° C./min, the temperature was maintained for 16 hours, and a product from the firing process was naturally cooled to 25° C.

Subsequently, the cooled product was washed with distilled water, filtered, and dried, and then was dry mixed with 500 ppm of $H_3BO_3$ (Aldrich®). The mixture was subjected to a second heat treatment at 280° C. for 5 hours to prepare a positive electrode active material coated with boron (B) on the surface.

Comparative Example 3—Ni 90% Positive Electrode Active Material Including 1700 ppm of LiOH and 3000 ppm of $Li_2CO_3$ A positive electrode active material having a coating layer including 1700 ppm of LiOH and 3000 ppm of $Li_2CO_3$ formed on the surface was prepared in the same manner as in Comparative Example 2, except that the cooled product was dry mixed with 250 ppm of LiOH based on Li and then was subjected to the second heat treatment.

Comparative Example 4—Ni 90% Positive Electrode Active Material Including 1700 ppm of LiOH, 3000 ppm of $Li_2CO_3$, and 30 ppm of $Li_2SO_4$ A positive electrode active material having a coating layer including 1700 ppm of LiOH, 3000 ppm of $Li_2CO_3$, and 30 ppm of $Li_2SO_4$ formed on the surface was prepared in the same manner as in Comparative Example 2, except that the cooled product was dry mixed with 250 ppm of LiOH and 30 ppm of $Li_2SO_4$ based on Li and S, and then was subjected to the second heat treatment.

Example 1—Ni 90% Positive Electrode Active Material Including 500 ppm of B, 1700 ppm of LiOH, 3000 ppm of $Li_2CO_3$, and 10 ppm of $Li_2SO_4$ A positive electrode active material having a coating layer including 500 ppm of B, 1700 ppm of LiOH, 3000 ppm of $Li_2CO_3$, and 10 ppm of $Li_2SO_4$ formed on the surface was prepared in the same manner as in Comparative Example 2, except that the cooled product was washed with distilled water, filtered, and dried, was dry mixed with 500 ppm of $H_3BO_3$, 250 ppm of LiOH, and 10 ppm of $Li_2SO_4$, and then was subjected to the second heat treatment.

Example 2—Preparation of Ni 90% Positive Electrode Active Material Including 500 ppm of B, 1700 ppm of LiOH, 3000 ppm of $Li_2CO_3$, and 100 ppm of $Li_2SO_4$ A positive electrode active material having a coating layer including 500 ppm of B, 1700 ppm of LiOH, 3000 ppm of $Li_2CO_3$, and 100 ppm of $Li_2SO_4$ formed on the surface was prepared in the same manner as in Example 1, except that the cooled product was washed with distilled water, filtered, and dried, was dry mixed with 500 ppm of $H_3BO_3$, 250 ppm of LiOH, and 20 ppm of $Li_2SO_4$, and was subjected to the second heat treatment.

Example 3—Preparation of Ni 90% Positive Electrode Active Material Including 500 ppm of B, 1700 ppm of LiOH, 3000 ppm of $Li_2CO_3$, and 150 ppm of $Li_2SO_4$ A positive electrode active material having a coating layer including 500 ppm of B, 1700 ppm of LiOH, 3000 ppm of $Li_2CO_3$, and 150 ppm of $Li_2SO_4$ formed on the surface was prepared in the same manner as in Example 1, except that the cooled product was washed with distilled water, filtered, and dried, was dry mixed with 500 ppm of $H_3BO_3$, 250 ppm of LiOH, and 30 ppm of $Li_2SO_4$, and was subjected to the second heat treatment.

Example 4—Preparation of Ni 90% Positive Electrode Active Material Including 500 ppm of B, 1700 ppm of LiOH, 3000 ppm of $Li_2CO_3$, and 200 ppm of $Li_2SO_4$ A positive electrode active material having a coating layer including 500 ppm of B, 1700 ppm of LiOH, 3000 ppm of $Li_2CO_3$, and 200 ppm of $Li_2SO_4$ formed on the surface was prepared in the same manner as Example 1, except that the cooled product was washed with distilled water, filtered, and dried, was dry mixed with 500 ppm of $H_3BO_3$, 250 ppm of LiOH, and 60 ppm of $Li_2SO_4$, and was subjected to the second heat treatment.

Example 5—Preparation of Ni 90% Positive Electrode Active Material Including 500 ppm of B, 1700 ppm of LiOH, 3000 ppm of $Li_2CO_3$, and 300 ppm of $Li_2SO_4$ A positive electrode active material having a coating layer including 500 ppm of B, 1700 ppm of LiOH, 3000 ppm of $Li_2CO_3$, and 300 ppm of $Li_2SO_4$ formed on the surface was prepared in the same manner as in Example 1, except that the cooled product was washed with distilled water, filtered, and dried, was dry mixed with 500 ppm of $H_3BO_3$, 250 ppm of LiOH, and 120 ppm of $Li_2SO_4$, and was subjected to the second heat treatment.

Example 6—Preparation of Ni 90% Positive Electrode Active Material Including 500 ppm of B, 1500 ppm of LiOH, 3000 ppm of $Li_2CO_3$, and 200 ppm of $Li_2SO_4$ A positive electrode active material having a coating layer including 500 ppm of B, 1500 ppm of LiOH, 3000 ppm of $Li_2CO_3$, and 500 ppm of $Li_2SO_4$ formed on the surface was prepared in the same manner as in Example 3, except that the cooled product was washed with distilled water, filtered, and dried, was dry mixed with 500 ppm of $H_3BO_3$, 50 ppm of LiOH, and 60 ppm of $Li_2SO_4$, and was subjected to the second heat treatment.

Example 7—Preparation of Ni 90% Positive Electrode Active Material Including 500 ppm of B, 1600 ppm of LiOH, 3000 ppm of $Li_2CO_3$, and 200 ppm of $Li_2SO_4$ A positive electrode active material having a coating layer including 500 ppm of B, 1600 ppm of LiOH, 3000 ppm of $Li_2CO_3$, and 200 ppm of $Li_2SO_4$ formed on the surface was prepared in the same manner as in Example 3, except that the cooled product was washed with distilled water, filtered, and dried, was dry mixed with 500 ppm of $H_3BO_3$, 100 ppm of LiOH, and 60 ppm of $Li_2SO_4$, and was subjected to the second heat treatment.

Example 8—Preparation of Ni 90% Positive Electrode Active Material Including 500 ppm of B, 1700 ppm of LiOH, 3000 ppm of $Li_2CO_3$, and 200 ppm of $Li_2SO_4$ A positive electrode active material having a coating layer including 500 ppm of B, 1700 ppm of LiOH, 3000 ppm of $Li_2CO_3$, and 200 ppm of $Li_2SO_4$ formed on the surface was prepared in the same manner as in Example 3, except that the cooled product was washed with distilled water, filtered, and dried, was dry mixed with 500 ppm of $H_3BO_3$, 250 ppm of LiOH, and 60 ppm of $Li_2SO_4$, and was subjected to the second heat treatment.

Example 9—Preparation of Ni 90% Positive Electrode Active Material Including 500 ppm of B, 2000 ppm of LiOH, 3000 ppm of $Li_2CO_3$, and 200 ppm of $Li_2SO_4$ A positive electrode active material having a coating layer including 500 ppm of B, 2000 ppm of LiOH, 3000 ppm of $Li_2CO_3$, and 200 ppm of $Li_2SO_4$ formed on the surface was prepared in the same manner as in Example 3, except that the cooled product was washed with distilled water, filtered, and dried, was dry mixed with 500 ppm of $H_3BO_3$, 500 ppm of LiOH, and 60 ppm of $Li_2SO_4$, and was subjected to the second heat treatment.

Example 10—Preparation of Ni 90% Positive Electrode Active Material Including 500 ppm of B, 2500 ppm of LiOH, 3000 ppm of $Li_2CO_3$, and 200 ppm of $Li_2SO_4$ A positive electrode active material having a coating layer including 500 ppm of B, 2500 ppm of LiOH, 3000 ppm of $Li_2CO_3$, and 200 ppm of $Li_2SO_4$ formed on the surface was prepared in the same manner as in Example 3, except that the cooled product was washed with distilled water, filtered, and dried, was dry mixed with 500 ppm of $H_3BO_3$, 1000 ppm of LiOH, and 60 ppm of $Li_2SO_4$, and was subjected to the second heat treatment.

Example 11—Preparation of Ni 90% Positive Electrode Active Material Including 500 ppm of B, 3500 ppm of LiOH, 3000 ppm of $Li_2CO_3$, and 200 ppm of $Li_2SO_4$ A positive electrode active material having a coating layer including 500 ppm of B, 3500 ppm of LiOH, 3000 ppm of $Li_2CO_3$, and 200 ppm of $Li_2SO_4$ formed on the surface was prepared in the same manner as in Example 3, except that the cooled product was washed with distilled water, filtered, and dried, was dry mixed with 500 ppm of $H_3BO_3$, 2000 ppm of LiOH, and 60 ppm of $Li_2SO_4$, and was subjected to the second heat treatment.

Example 12—Preparation of Ni 90% Positive Electrode Active Material Including 500 ppm of B, 1700 ppm of LiOH, 3000 ppm of $Li_2CO_3$, and 150 ppm of $Li_2SO_4$ A positive electrode active material having a coating layer including 500 ppm of B, 1700 ppm of LiOH, 3000 ppm of $Li_2CO_3$, and 150 ppm of $Li_2SO_4$ formed on the surface was prepared in the same manner as in Example 3, except that the second heat treatment was performed at 200° C.

Example 13—Preparation of Ni 90% Positive Electrode Active Material Including 500 ppm of B, 1700 ppm of LiOH, 3000 ppm of $Li_2CO_3$, and 150 ppm of $Li_2SO_4$ A positive electrode active material having a coating layer including 500 ppm of B, 1700 ppm of LiOH, 3000 ppm of $Li_2CO_3$, and 150 ppm of $Li_2SO_4$ formed on the surface was prepared in the same manner as in Example 3, except that the second heat treatment was performed at 220° C.

Example 14—Preparation of Ni 90% Positive Electrode Active Material Including 500 ppm of B, 1700 ppm of LiOH, 3000 ppm of $Li_2CO_3$, and 150 ppm of $Li_2SO_4$ A positive electrode active material having a coating layer including 500 ppm of B, 1700 ppm of LiOH, 3000 ppm of $Li_2CO_3$, and 150 ppm of $Li_2SO_4$ formed on the surface was prepared in the same manner as in Example 3, except that the second heat treatment was performed at 240° C.

Example 15—Preparation of Ni 90% Positive Electrode Active Material Including 500 ppm of B, 1700 ppm of LiOH, 3000 ppm of $Li_2CO_3$, and 150 ppm of $Li_2SO_4$ A positive electrode active material having a coating layer including 500 ppm of B, 1700 ppm of LiOH, 3000 ppm of $Li_2CO_3$, and 150 ppm of $Li_2SO_4$ formed on the surface was prepared in the same manner as in Example 3, except that the second heat treatment was performed at 260° C.

Example 16—Preparation of Ni 90% Positive Electrode Active Material Including 500 ppm of B, 1700 ppm of LiOH, 3000 ppm of $Li_2CO_3$, and 150 ppm of $Li_2SO_4$ A positive electrode active material having a coating layer including 500 ppm of B, 1700 ppm of LiOH, 3000 ppm of $Li_2CO_3$, and 150 ppm of $Li_2SO_4$ formed on the surface was prepared in the same manner as in Example 3, except that the second heat treatment was performed at 300° C.

Example 17—Preparation of Ni 90% Positive Electrode Active Material Including 500 ppm of B, 1700 ppm of LiOH, 3000 ppm of $Li_2CO_3$, and 150 ppm of $Li_2SO_4$ A positive electrode active material having a coating layer including 500 ppm of B, 1700 ppm of LiOH, 3000 ppm of $Li_2CO_3$, and 150 ppm of $Li_2SO_4$ formed on the surface was prepared in the same manner as in Example 3, except that the second heat treatment was performed at 450° C.

Example 18—Preparation of Ni 90% Positive Electrode Active Material Including 1000 ppm of B, 1700 ppm of LiOH, 3000 ppm of $Li_2CO_3$, and 150 ppm of $Li_2SO_4$ A positive electrode active material having a coating layer including 1000 ppm of B, 1700 ppm of LiOH, 3000 ppm of $Li_2CO_3$, and 150 ppm of $Li_2SO_4$ formed on the surface was prepared in the same manner as in Example 3, except that 1000 ppm of $H_3BO_3$ was dry mixed therewith.

Example 19—Preparation of Ni 90% Positive Electrode Active Material Including 300 ppm of B, 2000 ppm of LiOH, 3000 ppm of $Li_2CO_3$, and 150 ppm of $Li_2SO_4$ A positive electrode active material having a coating layer including 300 ppm of B, 2000 ppm of LiOH, 3000 ppm of $Li_2CO_3$, and 150 ppm of $Li_2SO_4$ formed on the surface was prepared in the same manner as in Example 3, except that 300 ppm of $H_3BO_3$ was dry mixed therewith.

Example 20—Preparation of Ni 90% Positive Electrode Active Material Including 100 ppm of B, 2000 ppm of LiOH, 3000 ppm of $Li_2CO_3$, and 150 ppm of $Li_2SO_4$ A positive electrode active material having a coating layer including 100 ppm of B, 2000 ppm of LiOH, 3000 ppm of $Li_2CO_3$, and 150 ppm of $Li_2SO_4$ formed on the surface was prepared in the same manner as in Example 3, except that 100 ppm of $H_3BO_3$ was dry mixed therewith.

Example 21—Preparation of Ni 90% Positive Electrode Active Material Including 500 ppm of B, 1700 ppm of LiOH, 3000 ppm of $Li_2CO_3$, and 1 ppm of $Li_2SO_4$ A positive electrode active material having a coating layer including 500 ppm of B, 1700 ppm of LiOH, 3000 ppm of $Li_2CO_3$, and 10 ppm of $Li_2SO_4$ formed on the surface was prepared in the same manner as in Example 1, except that the cooled product was washed with distilled water, filtered, and dried, was dry mixed with 500 ppm of $H_3BO_3$, 250 ppm of LiOH, and 10 ppm of $Li_2SO_4$, and was subjected to a second heat treatment.

Example 22—Preparation of Ni 90% Positive Electrode Active Material Including 500 ppm of B, 1700 ppm of LiOH, 3000 ppm of $Li_2CO_3$, and 5 ppm of $Li_2SO_4$ A positive electrode active material having a coating layer including 500 ppm of B, 1700 ppm of LiOH, 3000 ppm of $Li_2CO_3$, and 5 ppm of $Li_2SO_4$ formed on the surface was prepared in the same manner as in Example 1, except that the cooled product was washed with distilled water, filtered, and dried, was dry mixed with 500 ppm of $H_3BO_3$, 250 ppm of LiOH, and 10 ppm of $Li_2SO_4$, and was subjected to a second heat treatment.

Example 23—Preparation of Ni 90% Positive Electrode Active Material Including 500 ppm of B, 1700 ppm of LiOH, 3000 ppm of $Li_2CO_3$, and 1000 ppm of $Li_2SO_4$ A positive electrode active material having a coating layer including 500 ppm of B, 1700 ppm of LiOH, 3000 ppm of $Li_2CO_3$, and 1000 ppm of $Li_2SO_4$ formed on the surface was prepared in the same manner as in Example 1, except that the cooled product was washed with distilled water, filtered, and dried, was dry mixed with 500 ppm of $H_3BO_3$, 250 ppm of LiOH, and 10 ppm of $Li_2SO_4$, and was subjected to a second heat treatment.

Example 24—Preparation of Ni 90% Positive Electrode Active Material Including 500 ppm of B, 100 ppm of LiOH, 3000 ppm of $Li_2CO_3$, and 200 ppm of $Li_2SO_4$ A positive electrode active material having a coating layer including 500 ppm of B, 100 ppm of LiOH, 3000 ppm of $Li_2CO_3$, and 200 ppm of $Li_2SO_4$ formed on the surface was prepared in the same manner as in Example 3, except that the cooled product was washed with distilled water, filtered, and dried, was dry mixed with 500 ppm of $H_3BO_3$ and 60 ppm of $Li_2SO_4$, and was subjected to a second heat treatment.

Example 25—Preparation of Ni 90% Positive Electrode Active Material Including 500 ppm of B, 7000 ppm of LiOH, 3000 ppm of $Li_2CO_3$, and 200 ppm of $Li_2SO_4$ A positive electrode active material having a coating layer including 500 ppm of B, 7000 ppm of LiOH, 3000 ppm of $Li_2CO_3$, and 200 ppm of $Li_2SO_4$ formed on the surface was prepared in the same manner as in Example 3, except that the cooled product was washed with distilled water, filtered, and dried, was dry mixed with 500 ppm of $H_3BO_3$, 4000 ppm of LiOH, and 60 ppm of $Li_2SO_4$, and was subjected to a second heat treatment.

Example 26—Preparation of Ni 90% Positive Electrode Active Material Including 10 ppm of B, 1700 ppm of LiOH, 3000 ppm of $Li_2CO_3$, and 150 ppm of $Li_2SO_4$ A positive electrode active material having a coating layer including 10 ppm of B, 1700 ppm of LiOH, 3000 ppm of $Li_2CO_3$, and 150 ppm of $Li_2SO_4$ formed on the surface was prepared in the same manner as in Example 3, except that 10 ppm of $H_3BO_3$ was dry mixed therewith.

Example 27—Preparation of Ni 90% Positive Electrode Active Material Including 5000 ppm of B, 1700 ppm of LiOH, 3000 ppm of $Li_2CO_3$, and 150 ppm of $Li_2SO_4$ A positive electrode active material having a coating layer including 5000 ppm of B, 1700 ppm of LiOH, 3000 ppm of $Li_2CO_3$, and 150 ppm of $Li_2SO_4$ formed on the surface was prepared in the same manner as in Example 3, except that 5000 ppm of $H_3BO_3$ was dry mixed therewith.

(Experimental Example 1) Evaluation of Electrochemical Performance (1) Manufacture of Coin-Type Half Battery The positive electrode active materials prepared according to Examples 1 to 27 and Comparative Examples 1 to 4 were used to manufacture coin-type half batteries.

Specifically, a positive electrode active material, a Denka Black conductive material, and a polyvinylidene fluoride binder (product name: KF1100) were mixed at a weight ratio of 92.5:3.5:4, and the mixture was added to a N-methyl-2-pyrrolidone solvent so that the solid content is about 30 wt %, thereby preparing a positive electrode active material slurry.

The slurry was applied on an aluminum foil (Al foil, thickness: 15 μm) which was a positive electrode current collector using a Doctor blade, dried, and rolled, thereby manufacturing a positive electrode. A loading amount of the positive electrode was about 14.6 mg/cm², and a rolling density was about 3.2 g/cm³.

The positive electrode, a lithium metal negative electrode (200 μm, Honzo metal), an electrolyte solution, and a polypropylene separator were used to manufacture a 2032 coin-type half battery by a common method. As the electrolyte solution, a mixed solution obtained by dissolving 1M $LiPF_6$ in a mixed solution of ethylene carbonate, dimethyl carbonate, and ethylmethyl carbonate (EMC) (mixing ratio: EC:DMC:EMC=3:4:3 by volume %) was used.

(2) Evaluation of 0.1 C Discharge Capacity at 25° C. and Initial Resistance at Room Temperature The coin-type half battery manufactured in (1) was aged at room temperature (25° C.) for 10 hours, and then a charge/discharge test was performed.

Capacity evaluation was performed using 215 mAh/g as a reference capacity and applying CC/CV 2.5-4.25V and 1/20 C cut-off as charge and discharge conditions. An initial capacity was performed under 0.1 C charge/0.1 C discharge conditions.

Resistance was calculated by measuring a voltage fluctuation for 60 seconds after applying a 0.2 C discharge current at 100% charge at 0.2 C, 4.25 V. The results are shown in the following Table 1.

(3) Evaluation of Life and Resistance Increase Rate at 45° C.

Cycle life characteristics at a high temperature were calculated by measuring a ratio of a 30th capacity to a first capacity after 30 measurements under the conditions of 0.3 C charge/0.3 C discharge at a high temperature (45° C.), and resistance was calculated by measuring a voltage fluctuation for 60 seconds after applying a discharge current at 100% charge at 4.25 V.

A resistance increase rate was calculated by measuring a resistance in the same manner as in the measurement of the initial resistance after 30 measurements of the cycle life to the initially measured resistance at a high temperature (45° C.) (initial resistance at a high temperature) and converting the increase rate into a percentage (%). The measurement results are shown in the following Table 2.

TABLE 1

| Classification | 0.1 C charge amount [mAh/g] | 0.1 C discharge amount [mAh/g] | $1^{st}$ efficiency [%] | Initial resistance at room temperature [Ω] |
|---|---|---|---|---|
| Comparative Example 1 | 232.3 | 205.9 | 88.6 | 16.8 |
| Comparative Example 2 | 238.3 | 217.0 | 91.0 | 23.3 |
| Comparative Example 3 | 238.0 | 215.7 | 90.6 | 23.3 |
| Comparative Example 4 | 239.0 | 217.6 | 91.0 | 22.7 |
| Example 1 | 240.4 | 219.7 | 91.4 | 22.0 |
| Example 2 | 240 | 219.8 | 91.6 | 21.7 |
| Example 3 | 240.3 | 219.6 | 91.4 | 21.7 |
| Example 4 | 240.2 | 220.0 | 91.6 | 21.8 |
| Example 5 | 239.6 | 220.7 | 92.1 | 22.0 |
| Example 6 | 240.5 | 219.3 | 91.2 | 22.1 |
| Example 7 | 240.1 | 219.1 | 91.3 | 21.8 |
| Example 8 | 240.2 | 220.0 | 91.6 | 21.8 |
| Example 9 | 240.0 | 219.6 | 91.5 | 21.7 |
| Example 10 | 240.3 | 219.3 | 91.3 | 21.8 |
| Example 11 | 240.2 | 219.7 | 91.5 | 21.8 |
| Example 12 | 235.4 | 211.9 | 90.0 | 21.9 |
| Example 13 | 238.2 | 215.1 | 90.3 | 22.9 |
| Example 14 | 238.8 | 215.9 | 90.4 | 22.6 |
| Example 15 | 238.9 | 218.6 | 91.5 | 22.5 |
| Example 16 | 237.6 | 218.0 | 90.5 | 22.4 |
| Example 17 | 235.3 | 211.8 | 90.0 | 16.1 |
| Example 18 | 239.1 | 217.8 | 91.1 | 23.2 |
| Example 19 | 239.8 | 219.0 | 91.3 | 21.5 |
| Example 20 | 237.1 | 214.9 | 90.6 | 25.4 |
| Example 21 | 239.4 | 218.5 | 91.3 | 22.1 |
| Example 22 | 239.1 | 218.4 | 91.3 | 22.6 |
| Example 23 | 237.5 | 211.8 | 89.2 | 26.1 |
| Example 24 | 239.5 | 219 | 91.4 | 22 |
| Example 25 | 240.1 | 215.5 | 89.8 | 23.1 |
| Example 26 | 235 | 212.2 | 90.3 | 25.6 |
| Example 27 | 236.5 | 207.5 | 87.7 | 28.5 |

TABLE 2

| Classification | Life at high temperature [%] | $1^{st}$ efficiency [Ω] | $30^{th}$ resistance [Ω] | Resistance increase rate [%] |
|---|---|---|---|---|
| Comparative Example 1 | 71.2 | 10.5 | 19.4 | 84.9 |
| Comparative Example 2 | 81.2 | 13.5 | 24.6 | 82.3 |
| Comparative Example 3 | 79.9 | 13.6 | 24.7 | 81.5 |
| Comparative Example 4 | 71.2 | 13.5 | 24.7 | 82.7 |
| Example 1 | 89.4 | 12.9 | 19.8 | 54 |
| Example 2 | 88.5 | 12.6 | 20.1 | 59.8 |
| Example 3 | 90.5 | 12.9 | 19.9 | 54.5 |
| Example 4 | 90.5 | 12.9 | 19.9 | 54.5 |
| Example 5 | 90.3 | 13.2 | 19.8 | 50.1 |
| Example 6 | 87.5 | 13.5 | 21.3 | 57.9 |
| Example 7 | 88.6 | 12.5 | 19.4 | 55.1 |
| Example 8 | 90.5 | 12.9 | 19.9 | 54.5 |
| Example 9 | 89.6 | 13.1 | 20.4 | 55.7 |
| Example 10 | 88.7 | 13.5 | 21.2 | 56.9 |
| Example 11 | 87.5 | 13.6 | 21.5 | 58.3 |
| Example 12 | 92.5 | 12.4 | 18.0 | 45.3 |
| Example 13 | 91 | 12.9 | 19.0 | 47.2 |
| Example 14 | 89 | 12.8 | 19.0 | 48.6 |
| Example 15 | 90 | 12.3 | 18.6 | 51.2 |
| Example 16 | 90 | 13.1 | 19.7 | 50.5 |
| Example 17 | 78.2 | 10.2 | 15.2 | 49.4 |
| Example 18 | 90.7 | 13.5 | 21.7 | 61 |
| Example 19 | 90.1 | 13.2 | 20.6 | 56.1 |
| Example 20 | 90.0 | 13.4 | 21.4 | 59.9 |
| Example 21 | 87.5 | 12.8 | 19.9 | 55.5 |
| Example 22 | 87.6 | 12.5 | 19.4 | 55.2 |
| Example 23 | 80.6 | 15.5 | 25.6 | 65.2 |
| Example 24 | 87.4 | 13.1 | 21.3 | 62.6 |

TABLE 2-continued

| Classification | Life at high temperature [%] | 1st efficiency [Ω] | 30th resistance [Ω] | Resistance increase rate [%] |
|---|---|---|---|---|
| Example 25 | 85 | 15.6 | 26.7 | 71.2 |
| Example 26 | 89.6 | 13.2 | 21.1 | 59.8 |
| Example 27 | 91.5 | 15.2 | 24.9 | 63.8 |

Table 1 shows the results of measuring the initial efficiency and the initial resistance at room temperature for the positive electrode active materials manufactured according to Examples 1 to 27 and Comparative Examples 1 to 4.

Table 2 shows the results of measuring the life at a high temperature and the resistance increase rate for the positive electrode active materials manufactured according to Examples 1 to 27 and Comparative Examples 1 to 4.

Referring to Tables 1 and 2, it is confirmed that the positive electrode active materials according to Examples 1 to 23, which included B, LiOH, $Li_2CO_3$, and $Li_2SO_4$ in the coating layer had improved initial capacity and life characteristics at a high temperature overall, and both decreased initial and high temperature resistance and the resistance increase rate, as compared with the positive electrode active materials according to Comparative Examples 1 to 4, on which no coating layer was formed or a coating layer not including all of B, LiOH, $Li_2CO_3$, and $Li_2SO_4$ was formed.

Figure 2:
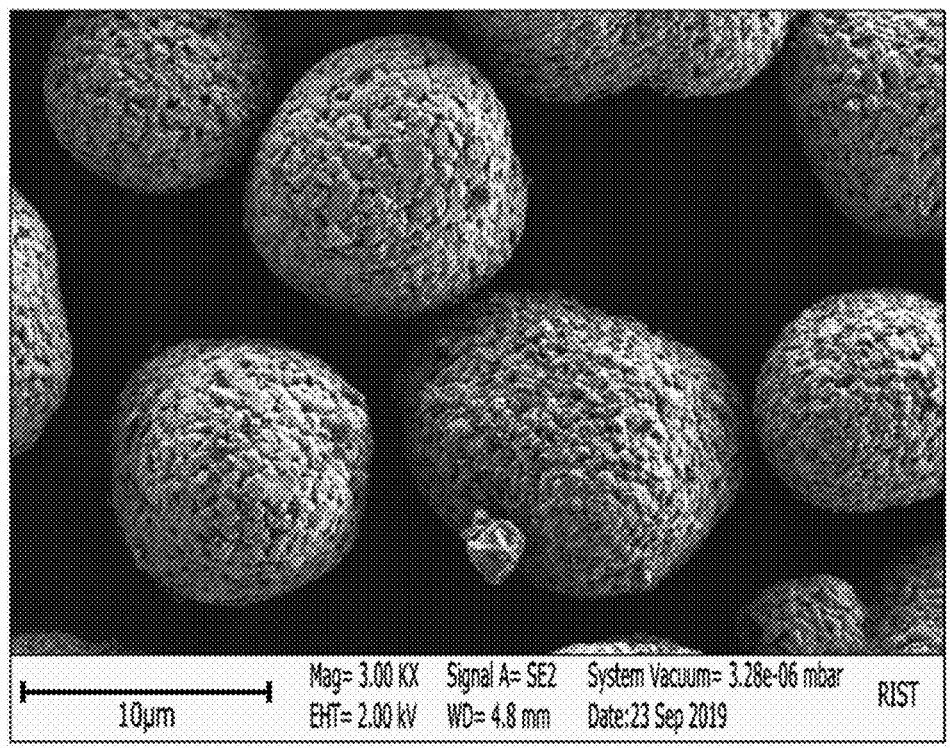
FIG. 2 shows results of SEM analysis of a surface of a positive electrode active material of Comparative Example 1.

(Experimental Example 2) SEM Analysis of Surface Portion of Positive Electrode Active Material The surfaces of the positive electrode active materials manufactured in Example 3 and Comparative Example 1 were analyzed by a scanning electron microscope (SEM, JEOL JSM-6610) and the results are shown in FIGS. 1 and 2, respectively.

Referring to FIGS. 1 and 2, it is confirmed that the positive electrode active material of Example 3 had a coating layer formed thereon which was uniform so that no primary particle was seen on the surface, as compared with the positive electrode active material of Comparative Example 1.

Figure 3:
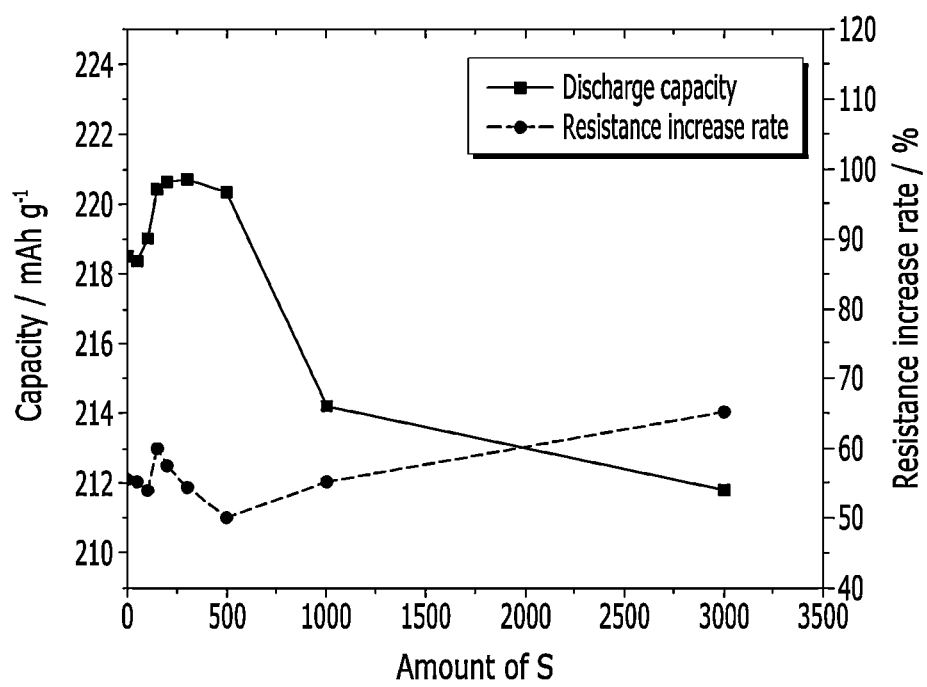
FIG. 3 shows an initial discharge capacity at room temperature and a resistance increase rate at a high temperature depending on a content of $Li_2SO_4$ included in a coating layer, as in Examples 1 to 5.

FIG. 3 shows the initial discharge capacity at room temperature and the resistance increase rate at a high temperature depending on the content of $Li_2SO_4$ included in the coating layer as in Examples 1 to 5.

Referring to FIG. 3, it is confirmed that the 0.1 C discharge capacity was the highest at 300 ppm of S, and the resistance increase rate was the lowest at 500 ppm of S.

Figure 4:
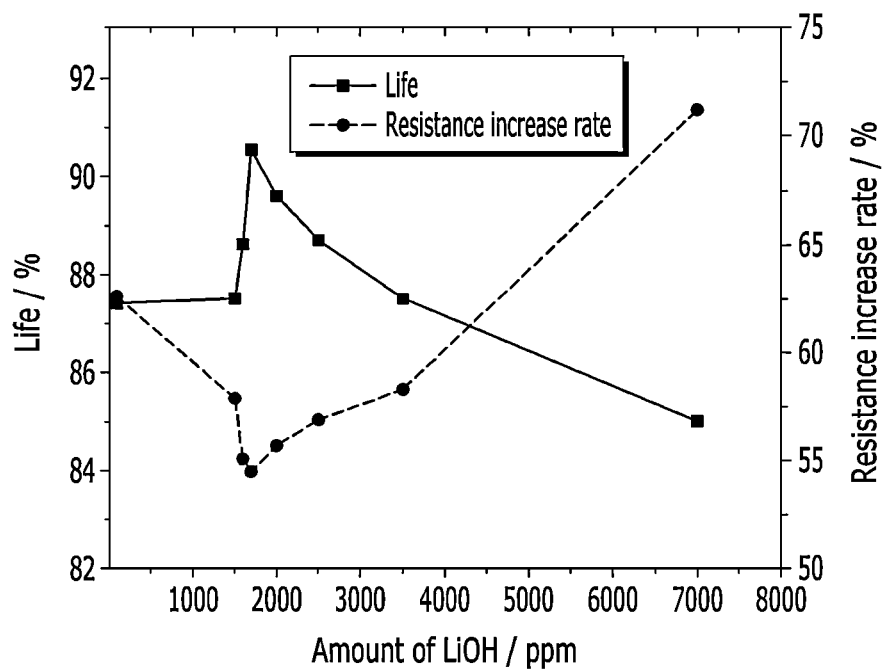
FIG. 4 shows life characteristics and a resistance increase rate at a high temperature depending on a content of LiOH included in a coating layer, as in Examples 6 to 11.

FIG. 4 shows the life characteristics at a high temperature and the resistance increase rate depending on the content of LiOH included in the coating layer as in Examples 6 to 11.

Referring to FIG. 4, the 0.1 C discharge capacity was the highest and the resistance increase rate was the lowest, at 1700 ppm of a LiOH content.

Figure 5:
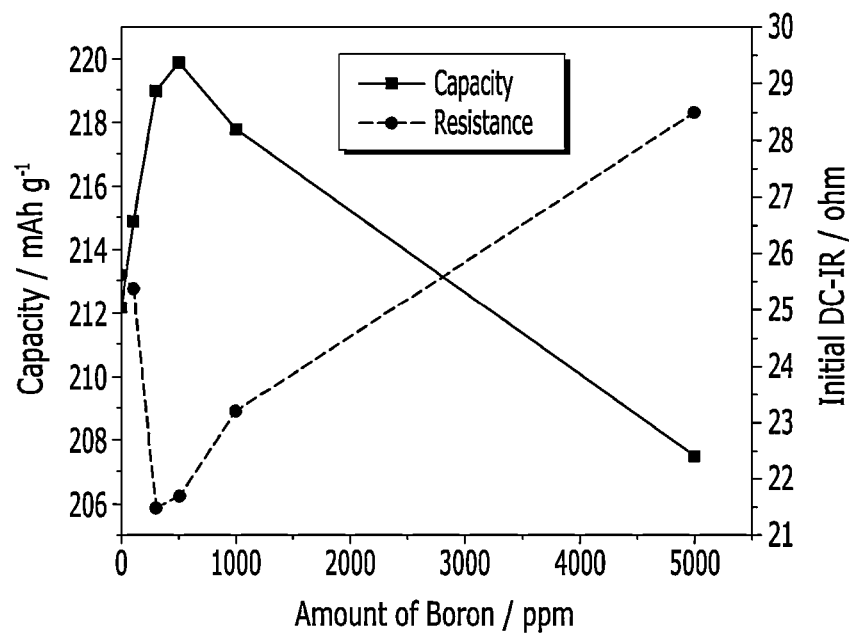
FIG. 5 shows a 0.1 C initial capacity and an initial resistance depending on a content of B included in a coating layer, as in Examples 18 to 20.

FIG. 5 shows the 0.1 C initial capacity and the initial resistance depending on the content of B included in the coating layer, as in Examples 18 to 20.

Referring to FIG. 5, the 0.1 C discharge capacity was the highest at 500 ppm of B, and the initial resistance was the lowest at 300 ppm of B.

Figure 6:
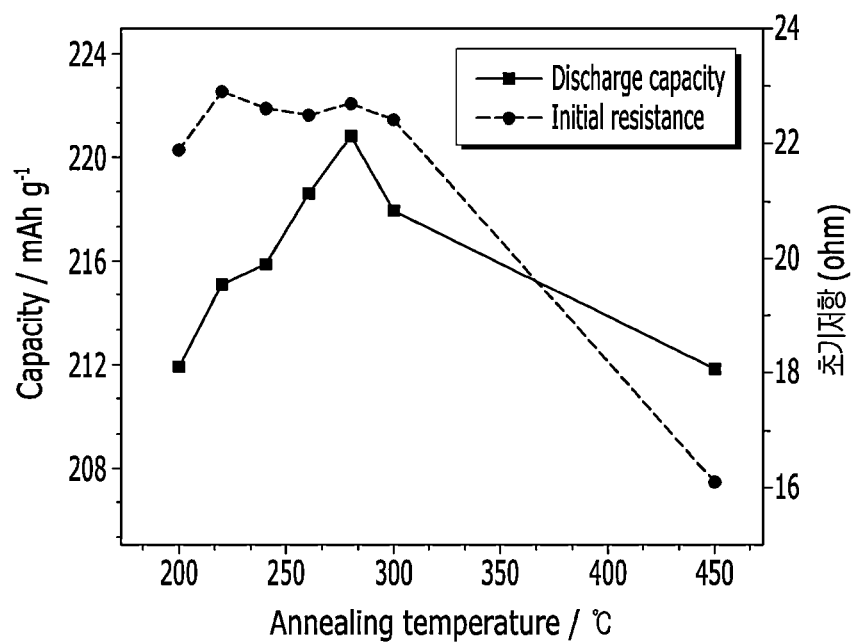
FIG. 6 shows 0.1 C charge/discharge capacity and initial resistance values at 25° C. and life and resistance increase rates at 45° C., by adjusting a second heat treatment temperature as in Examples 12 to 17.

FIG. 6 shows the 0.1 C charge/discharge capacity and the initial resistance value at 25° C., and the life and the resistance increase rate at 45° C., by adjusting the second heat treatment temperature as in Examples 12 to 17.

Referring to FIG. 6, the 0.1 C discharge capacity was the highest, the life characteristics were excellent, and the resistance increase rate was the lowest, at a second heat treatment temperature of 280° C.

Figure 7:
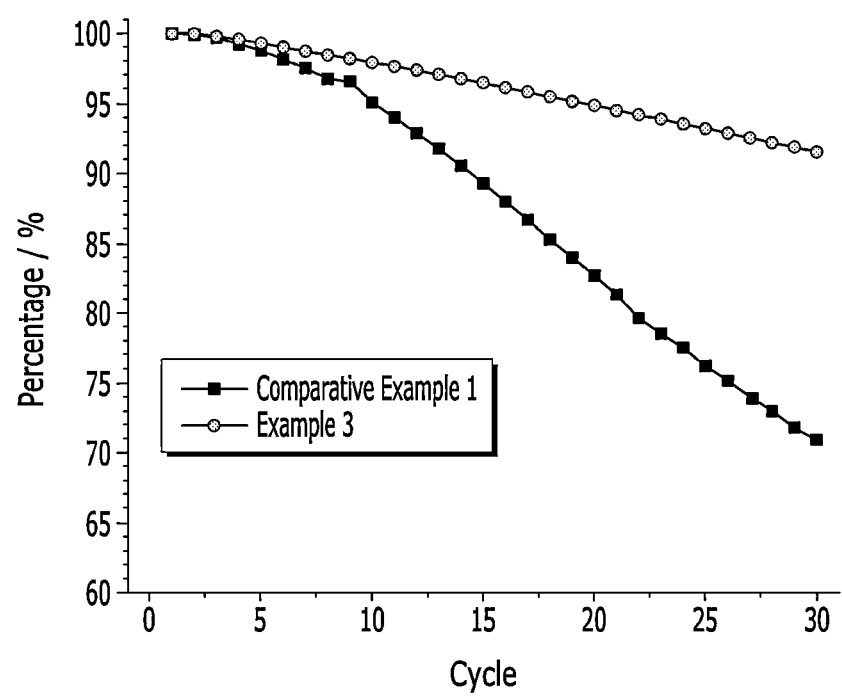
FIG. 7 shows results of evaluating life characteristics at a high temperature for the positive electrode active materials of Comparative Example 1 and Example 3.

FIG. 7 shows the results of evaluating the life characteristics at a high temperature for the positive electrode active materials of Comparative Example 1 and Example 3. Referring to FIG. 7, the life at a high temperature was about 71% in Comparative Example 1, but the life was about 91% in Example 3, and thus, it is confirmed that the life of Example 3 was significantly improved.

The present invention is not limited to the exemplary embodiments, but may be produced in various forms different from each other. A person with ordinary skill in the art to which the present invention pertains will understand that the present invention may be carried out in other specific forms without changing the technical idea or the essential feature of the present invention. Therefore, the exemplary embodiments described above should be understood to be illustrative in all respects, and not to be restrictive.

The invention claimed is:

1. A positive electrode active material for a lithium secondary battery comprising:
   lithium metal oxide particles; and
   a coating layer placed on at least a part of a surface of the lithium metal oxide particles,
   wherein the coating layer includes B, LiOH, $Li_2CO_3$, and $Li_2SO_4$, and
   wherein a content of $Li_2SO_4$ is 10 ppm to 500 ppm, based on the entire positive electrode active material.

2. The positive electrode active material for a lithium secondary battery of claim 1, wherein:
   a content of B is 10 ppm to 5000 ppm, based on the entire positive electrode active material.

3. The positive electrode active material for a lithium secondary battery of claim 1, wherein:
   a content of LiOH is 10 ppm to 10,000 ppm, based on the entire positive electrode active material.

4. The positive electrode active material for a lithium secondary battery of claim 1, wherein:
   a content of $Li_2CO_3$ is 1000 ppm to 5000 ppm, based on the entire positive electrode active material.

5. The positive electrode active material for a lithium secondary battery of claim 1, wherein:
   the $Li_2CO_3$ comes from an internal reaction, without introducing a lithium raw material separately.

6. The positive electrode active material for a lithium secondary battery of claim 1, wherein:
   a content of nickel of metals in the lithium metal oxide particles is 85 mol % or more.

7. A lithium secondary battery comprising:
   a positive electrode including the positive electrode active material of claim 1;
   a negative electrode; and
   a non-aqueous electrolyte.

* * * * *